US012053787B2

(12) United States Patent
De Kruijf et al.

(10) Patent No.: US 12,053,787 B2
(45) Date of Patent: Aug. 6, 2024

(54) ATOMIZER DEVICE

(71) Applicant: Medspray B.V., Enschede (NL)

(72) Inventors: Wilhelmus Petrus Johannes De Kruijf, Enschede (NL); Cornelis Johannes Maria Van Rijn, Amsterdam (NL); Wietze Nijdam, Enschede (NL); Henri Joseph Van Egmond, Enschede (NL)

(73) Assignee: Medspray B.V., Enschede (NL)

( * ) Notice: Subject to any disclaimer, the term of this patent is extended or adjusted under 35 U.S.C. 154(b) by 378 days.

(21) Appl. No.: 17/430,097

(22) PCT Filed: Feb. 12, 2020

(86) PCT No.: PCT/NL2020/050077
§ 371 (c)(1),
(2) Date: Aug. 11, 2021

(87) PCT Pub. No.: WO2020/167119
PCT Pub. Date: Aug. 20, 2020

(65) Prior Publication Data

US 2022/0143638 A1 May 12, 2022

(30) Foreign Application Priority Data

Feb. 12, 2019 (NL) ...................................... 2022560

(51) Int. Cl.
*B05B 11/00* (2023.01)
*B05B 1/30* (2006.01)
*B65D 83/14* (2006.01)

(52) U.S. Cl.
CPC ........ *B05B 11/0062* (2013.01); *B05B 1/3026* (2013.01); *B65D 83/7535* (2013.01)

(58) Field of Classification Search
CPC . B05B 11/0062; B05B 1/3026; B05B 1/3006; B65D 83/7535
See application file for complete search history.

(56) References Cited

U.S. PATENT DOCUMENTS

| | | | | |
|---|---|---|---|---|
| 2,623,782 A * | 12/1952 | Gustafson | B05B 7/066 239/533.1 |
| 2,825,602 A * | 3/1958 | Rabbitt | B05B 7/1272 239/117 |

(Continued)

FOREIGN PATENT DOCUMENTS

| | | |
|---|---|---|
| WO | 9967025 A1 | 12/1999 |
| WO | 2018203018 A1 | 11/2018 |

OTHER PUBLICATIONS

International Search Report and Written Opinion, PCT Application No. PCT/NL2020/050077, mailed May 25, 2020 (9 pages).

*Primary Examiner* — Donnell A Long
(74) *Attorney, Agent, or Firm* — Occhiuti & Rohlicek LLP

(57) ABSTRACT

An atomizer device for atomizing a liquid under increased pressure, comprising an atomizer body 14 with one or more atomizing openings from which a mist formed from the liquid escapes during operation. The device comprises a valve device 20, 30 upstream of the atomizer body. The valve device 20, 30 comprises a valve cavity 31 with a valve body 32 and a spring chamber 21 in which spring means 22 are compressible counter to a spring tension. The valve body 24 receives the liquid in valve cavity 31 with a first operative cross-section D1, which first operative cross-section is smaller than a second operative cross-section D2 of spring chamber 21 in which spring means 22 are compressible.

11 Claims, 2 Drawing Sheets

(56) References Cited

U.S. PATENT DOCUMENTS

| | | | | |
|---|---|---|---|---|
| 3,581,999 | A | 6/1971 | Fehler | |
| 6,779,690 | B2 | 8/2004 | Masuzzo et al. | |
| 2004/0188551 | A1 * | 9/2004 | Evans | B05B 1/302<br>239/569 |
| 2006/0054224 | A1 | 3/2006 | Lasebnick et al. | |
| 2008/0017666 | A1 * | 1/2008 | Vanblaere | B65D 83/44<br>222/380 |
| 2008/0105769 | A1 * | 5/2008 | Tschantz | B05B 1/3006<br>239/569 |

* cited by examiner

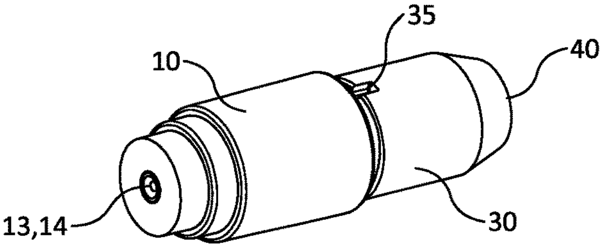
Fig.1
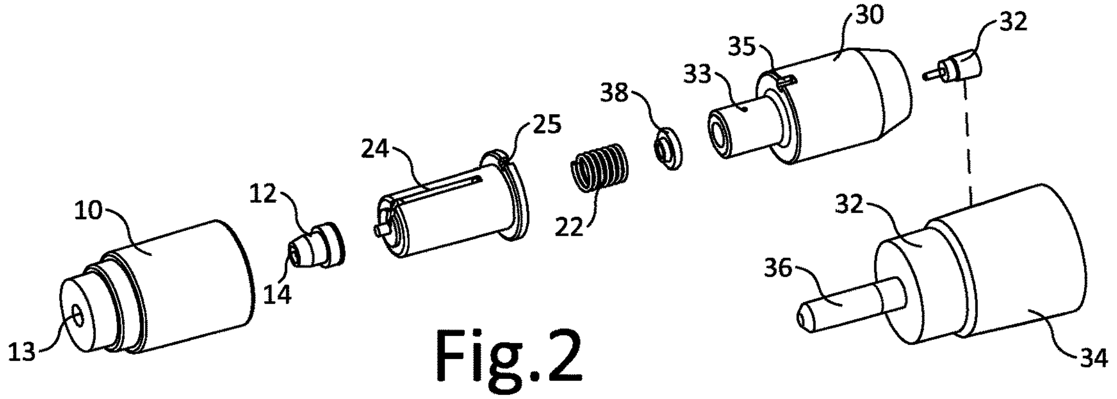
Fig.2
Fig.2A
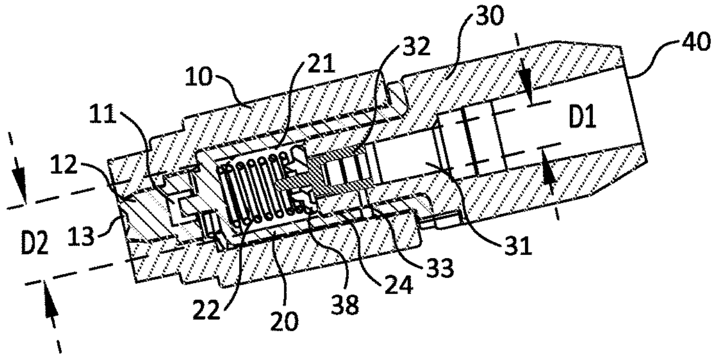
Fig.3A
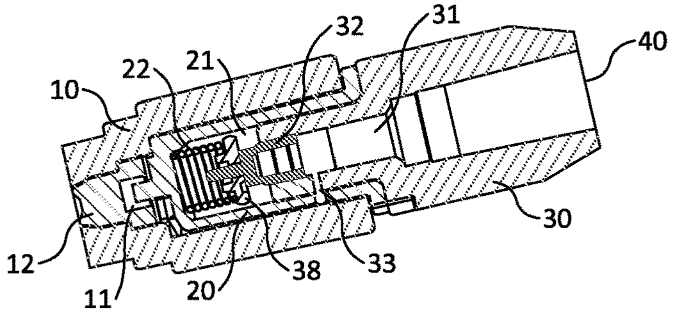
Fig.3B

ATOMIZER DEVICE

RELATED APPLICATIONS

This application is a national phase under 35 U.S.C. 371 of international application no. PCT/NL2020/050077, filed on Feb. 12, 2020, which claims priority to NL application 2022560, filed on Feb. 12, 2019, the contents of which are incorporated herein by reference.

The present invention relates to an atomizer device for atomizing a liquid under increased pressure, comprising an atomizer body with one or more atomizing openings from which a mist formed from the liquid escapes during operation, and comprising a valve device upstream of the atomizer body, which valve device opens from a predetermined threshold value of a liquid pressure exerted thereon by the liquid.

An atomizer device of the type stated in the preamble is used to atomize a liquid which is suitable therefor, which can here be of diverse nature. These can be pharmaceutical, cosmetic and therapeutic liquids which, after being atomized as a fine mist, are inhaled or otherwise brought into contact with the body. There are however also numerous applications of a more technical nature, wherein it is desirable to apply or arrange a liquid in a finely distributed mist. The liquid is for this purpose pressurized with pump means provided for this purpose and carried to the atomizer body under pressure. The atomizer body comprises one or more atomizing openings through which the liquid is thus forced under increased pressure in the form of a series of successive droplets for the purpose of forming a finely distributed mist.

The underlying physical mechanism forming the basis of such an atomization can vary in accordance with the nature of the atomizer body and the dimensions of the atomizing opening(s). An important mechanism is so-called Rayleigh breakup. The atomizer device according to the invention is particularly suitable for generating a so-called micro-jet spray of very fine droplets, with a controlled, predefined size on the basis of this mechanism. Such a micro-jet spray is usually formed by a large number of individual jets, each coming from an individual atomizing opening. These openings have cross-sections here of several micrometres to less than a micrometre. Each jet of the spray initially comprises a monodisperse primary droplet train which was formed from the liquid by Rayleigh breakup. As a result thereof, successive droplets initially have substantially the same size and move away from the atomizing opening in the same direction.

The diameter of the primary droplet is usually 1.85-2.0 times the diameter of the atomizing opening, and thus also frequently lies within the micrometre range. By providing the atomizing openings in the atomizer body with a high degree of precision with the same size a mist can thus be formed with a particularly minor variation in droplet size therein. Although the average droplet size may increase as a result of coalescence between droplets, the final droplet size distribution in the spray is still maintained within relatively narrow limits. This makes such a mist particularly suitable for demanding applications, wherein the individual droplet size determines the effectiveness of the spray.

It has been found in practice that, besides the dimensions and nature of the atomizer body, the liquid pressure applied to the liquid is also an important factor for a correct spray pattern. Below a determined pressure level, the liquid has been found unable to break up into droplets, and instead the liquid drips from the surface of the atomizer body, referred to as drooling. In particular, the smaller the atomizing openings are for the purpose of forming a finer mist, the higher this threshold value is, and it can be in the order of as much as 8-10 bar. In order to prevent this, the atomizer device comprises a valve body upstream, which closes the liquid supply to the atomizer body below this pressure and opens it only after this threshold value has been reached.

In continued miniaturization of atomizer devices it has been found problematic to provide therein a valve device which operates at such a high pressure. As the dimensions thereof decrease, an existing valve device will already give in below such a liquid pressure level, whereby an undesirable spray pattern or no mist at all is obtained. The present invention has for its object, among others, to provide an atomizer device of the type described in the preamble, which provides a spray pattern only when a sufficiently high threshold pressure is reached, also in the case of further miniaturization.

In order to achieve the stated object an atomizer device of the type described in the preamble has the feature according to the invention that the valve device comprises a valve cavity, in which a valve body is movable and lies all around sealingly against a wall thereof, and on a side of the valve body remote from the valve cavity a spring chamber in which spring means are compressible counter to a spring tension, that the valve body is subjected to a counter-pressure of the spring means and in a first, closing state closes a liquid channel between the valve cavity and the atomizer body, that the valve body can be urged into a second state under the influence of a pressure exerted by the liquid, wherein the liquid channel is released, and that the liquid acts on the valve body over a first operative cross-section in the valve cavity, which first operative cross-section is smaller than a second operative cross-section over which the valve body acts on the spring means in the spring chamber.

The invention is here based on the insight that a constriction of the operative cross-section of the valve cavity, and thereby the area with which the liquid acts on the valve body, results in a reduction of the play of forces exerted on the spring means from the valve body. These latter can thus withstand a greater liquid pressure, which opens the way to a further miniaturization of the atomizer device as a whole. The first operative cross-section in particular is here at least substantially equal to a cross-section of the valve cavity and the second operative cross-section is at least substantially equal to a cross-section of the spring chamber, whereby a diameter ratio between the spring chamber and the valve cavity will be at least substantially equal to a transmission ratio between these forces.

In a preferred embodiment the atomizer device according to the invention is characterized in that the valve cavity comprises an inlet upstream and is adjacent to the spring chamber on an opposite distal side, that a valve opening which opens into the liquid channel is provided in a wall of the valve cavity, that the valve body closes the valve cavity upstream of the valve opening in the first, closing state and in the second state lies distally beyond the valve opening. The valve body functions here as a closing piston in the valve cavity, which in the first state separates the inlet from the valve opening, but in the second state allows an open communication between the inlet and the valve opening.

In a further preferred embodiment the atomizer device is here characterized in that the valve body comprises on a side directed toward the inlet of the valve cavity a flexible cup-like skirt which lies sealingly against a wall of the valve cavity. The flexibility and (hollow) form of the skirt here allow the skirt to be pressed more forcefully against the wall of the valve cavity as the liquid pressure increases. This has been found to provide a particularly effective seal on the wall of the valve cavity.

In a further preferred embodiment the atomizer device according to the invention is characterized by an atomizer holder part comprising an atomizer cavity which is bounded on an outlet side by the atomizer body, by a spring holder part which comprises the spring chamber with the spring means and which is placed with a distal outer end in the atomizer cavity, and by a valve holder part which comprises the valve cavity with the valve body therein and protrudes with a distal outer end into the spring chamber, that the spring holder part lies sealingly against a wall of the atomizer cavity, and that the valve holder part lies sealingly against a wall of the spring chamber. The atomizer device thus comprises an assembly of a number of individual holder parts which can be placed in each other in simple manner as part of the assembly of the atomizer device. The desired liquid-tightness mutually between the holder parts can here be realized with interposing of a suitable seal. A further preferred embodiment of the atomizer device according to the invention has in this respect however the feature that the spring holder part lies clampingly against the wall of the atomizer cavity with a close fit and that the valve holder part lies clampingly against the wall of the spring chamber with a close fit. Owing to such a press fit, pressing the parts into each other suffices for obtaining the assembly therefrom.

With a view to a transmission of the liquid pressure to the spring means a further particular embodiment of the atomizer device according to the invention has the feature that the valve body comprises a relatively stiff disc on which the spring means support in the spring chamber and that the disc body hits an edge of the valve cavity in the first, closing state. For the connection between the disc and the valve body it is here also possible to make use of a mutual clamping, in line with the further assembly of the device.

In a further preferred embodiment the atomizer device according to the invention has the feature that the spring chamber in the spring holder part is airtight and, at least in the second state, an air content is confined therein. This air content will thereby resist a further compression, and provides here a counter-pressure to the valve body, which translates to the imposed threshold value of the liquid pressure.

A further particular embodiment of the device according to the invention has the feature that the atomizer body is encased in an atomizer holder of an atomizer unit. The relatively small atomizer body is here first assembled with the atomizer holder into a more easily manageable atomizer unit. This can in turn be placed in the atomizer holder part of the atomizer device. For the spring means use is advantageously made of a coil spring, particularly one of metal. Although a continuing miniaturization thereof will undeniably result in a lower spring constant, a sufficiently high liquid pressure can nevertheless be withstood therewith because of the invention, owing to a constriction of the valve cavity geared thereto.

The invention will be further elucidated hereinbelow on the basis of an exemplary embodiment and an accompanying drawing. In the drawing:

FIG. 1 shows an exemplary embodiment of an atomizer device according to the invention;

FIG. 2 shows an exploded view of the atomizer device of FIG. 1;

FIG. 2A shows an enlarged view of a valve body as applied in the atomizer device of FIG. 1;

FIG. 3A shows a cross-section of the atomizer device of FIG. 1 in a first, closing state;

FIG. 3B shows a cross-section of the atomizer device of FIG. 1 in a second, opened state.

It is otherwise noted that the figures are purely schematic and not always drawn to (the same) scale. Some dimensions in particular may be exaggerated to greater or lesser extent for the sake of clarity. Corresponding parts are designated in the figures with the same reference numeral.

Figure 4:
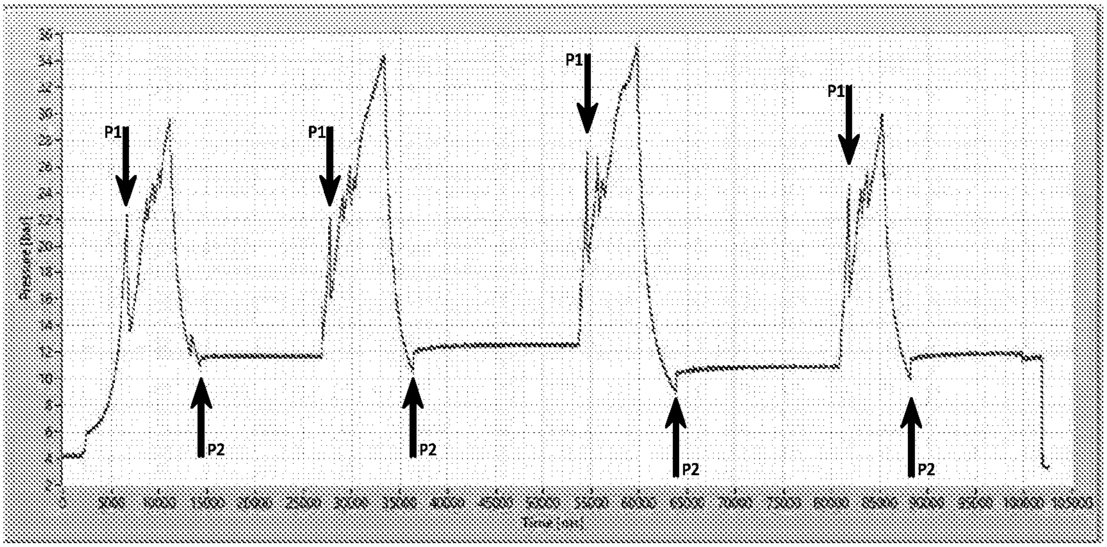
FIG. 4 shows a pressure profile of the atomizer device of FIG. 1.

The atomizer device shown in FIG. 1 is manufactured substantially wholly from plastic. As such, the atomizer device comprises an atomizer holder part 10 of polyethylene, with a spray opening 13 in which an atomizer unit 12 is placed, see also FIG. 2. Atomizer unit 12 in turn comprises a plastic atomizer holder as casing in which an atomizer body 14 (not further shown) is placed. On one side this atomizer body is in open communication with an atomizer cavity 11 inside atomizer holder 12 and atomizer holder part 10, and on the other opens with a spraying surface within spray opening 13 in order to dispense a liquid mist there.

Upstream of atomizer holder part 10 the atomizer device comprises successively a spring holder part 20 and a valve holder part 30, each likewise of polypropylene. Spring holder part 20 comprises a spring chamber 21 in which are accommodated spring means in the form of a coil spring 22 of steel or another suitable material, or a metal alloy. Apart from an opening for receiving the valve holder part, the spring chamber is fully airtight so that an air content thereof is confined therein. A groove 26 lies externally in a wall of the spring holder part, as part of a liquid channel between the atomizer cavity and an inlet 40 of the device.

This inlet 40 lies upstream of valve holder part 30. Just as the other holder parts, this component is also manufactured from polypropylene, wherein use is made of an individual injection moulded part for each of the components 10, 12, 20, 30. Valve holder part 30 here takes an extra stiff form in order to prevent deformation thereof, and comprises a valve cavity 31 which extends between inlet 40 and a valve body 32 which is received movably in the valve cavity with a close fit. Valve body 32 is also formed wholly from a suitable plastic such as, likewise, polypropylene, wherein use is made of a relatively stiff distal part 32 thereof and, connecting thereto, a relatively flexible proximal part which forms a hollow skirt 34. This skirt 34 provides for a desired liquid seal on an inner wall of valve cavity 31. The valve body moreover comprises on a distal side a shaft 36 with which it protrudes out of valve holder part 30 and into spring chamber 21. Received thereon is a disc 38 which supports the spring 22 and is therefore manufactured from an extremely stiff material, such as for instance polyoxymethylene (POM), in order to prevent deformation under the influence of the spring pressure.

In a wall of valve cavity 31 the valve holder part 30 comprises a continuous valve opening 33 which, in assembled state, is in register with the liquid channel 24 in the wall of the spring holder part. Owing to an accurate dimensioning of the various components shown in FIG. 2, they fit seamlessly into each other, and the whole can be assembled purely by mutual press fits, see also FIGS. 3A and 3B. Registration marks 25, 35 in the form of shallow recesses intended for this purpose provide here a guide for a correct relative orientation.

FIG. 3A shows the atomizer device in a first closed state. Disc 38 supports here on an edge 37 of valve cavity 31, and spring 22 lies clamped between disc 38 and a distal outer end of spring chamber 21. As can be seen more clearly in FIG. 2, liquid channel 24 opens downstream into atomizer cavity 11. Upstream, liquid channel 24 lies in line with valve opening 33, but this opening is as yet separated from inlet 40 by valve body 32. There is therefore no open communication now between inlet 40 and liquid channel 24 to atomizer cavity 11. Valve body 32 is held in this position by spring 22 and with interposing of disc 38.

Once a liquid for atomizing is let in under increased pressure via inlet 40, the valve body will be subjected hereby to a force directed counter to the spring force of spring 22. This force is roughly proportional to the operative cross-section D1 of valve body 32, 34 and thereby of valve cavity 31. This cross-section D1 is significantly smaller than a corresponding operative cross-section D2 of spring chamber 21, whereby only a limited force from the liquid is transmitted to the spring, proportionally to the mutual ratio D1:D2.

It is thereby only at a liquid pressure in the order of 20 bar that the spring is compressed sufficiently to allow valve body 32 with skirt 34 to move distally beyond valve opening 33. Not until this state, see FIG. 3B, is there an open liquid connection between valve opening 33 and inlet 40 of valve cavity 31, and can the liquid reach the atomizer cavity 11 with atomizer body 14 via liquid channel 24. The atomizer body will therefore always experience a minimal liquid pressure of this order of magnitude which is amply sufficient to ensure a good operation of the atomizer device and form a fine mist.

FIG. 4 shows the pressure profile of the valve device shown here. This shows that the valve device does not open until a pressure of about 22 bar, indicated with arrows P1, and closes below a pressure of roughly 12 bar, indicated with arrows P2. This hysteresis is presumably caused by friction effects between valve body 32, 34 and the inner wall of the valve cavity, but has no further effect on a correct operation of the atomizer device. The closing pressure of 12 bar is still sufficiently high for a perfect spray pattern.

These threshold values P1, P2 can be imposed despite the relatively small dimensions of the components involved. In this exemplary embodiment the spring chamber thus has a diameter D2 of only about 4 millimetres to enable a sufficiently strong yet relatively small spring 22 to be placed therein. If the liquid were to act directly thereon, this spring would not be able per se to withstand a pressure of the above stated order within the outlined dimensions. With a diameter D1 of about 2 millimetres the valve cavity is significantly smaller, whereby the force effect on spring 22 is reduced by about half and it can still impose a threshold value of the above stated magnitude.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art. Instead of using polypropylene for all or some of the plastic components of the atomizer device, it is thus also possible to use one or more other plastics or even other materials, such as metal. The stated dimensions are given only by way of example, but can also be chosen differently for a specific application. The same applies to the stated ratio between the two cross-sections D2:D1. By an adequate configuration and tuning of this ratio a desired threshold value for the liquid pressure can always be set and imposed with given spring means.

The invention claimed is:

1. Atomizer device for atomizing a liquid under increased pressure, comprising an atomizer body with one or more atomizing openings from which a mist formed from the liquid escapes during operation, and comprising a valve device upstream of the atomizer body, which valve device opens from a predetermined threshold value of a liquid pressure exerted thereon by the liquid, wherein the valve device comprises a valve cavity, in which a valve body is movable and lies all around sealingly against a wall thereof, and on a side of the valve body remote from the valve cavity a spring chamber in which spring means are compressible counter to a spring tension, wherein the valve body is subjected to a counter-pressure of the spring means and in a first, closing state closes a liquid channel between the valve cavity and the atomizer body, wherein the valve body can be urged into a second state under the influence of a pressure exerted by the liquid, wherein the liquid channel is released, and wherein the liquid in the valve cavity acts on the valve body over a first operative cross-section, which first operative cross-section is smaller than a second operative cross-section over which the valve body acts on the spring means in the spring chamber.

2. Atomizer device according to claim 1, wherein the valve cavity comprises an inlet upstream and is adjacent to the spring chamber on an opposite distal side, wherein a valve opening which opens into the liquid channel is provided in a wall of the valve cavity, wherein the valve body closes the valve cavity upstream of the valve opening in the first, closing state and in the second state lies distally beyond the valve opening.

3. Atomizer device according to claim 2, wherein the valve body comprises on a side directed toward the inlet of the valve cavity a flexible cup-like skirt which lies sealingly against a wall of the valve cavity.

4. Atomizer device according to claim 1, characterized by an atomizer holder part comprising an atomizer cavity which is bounded on an outlet side by the atomizer body, by a spring holder part which comprises the spring chamber with the spring means and which is placed with a distal outer end in the atomizer cavity, and by a valve holder part which comprises the valve cavity with the valve body therein and protrudes with a distal outer end into the spring chamber, wherein the spring holder part lies sealingly against a wall of the atomizer cavity, and wherein the valve holder part lies sealingly against a wall of the spring chamber.

5. Atomizer device according to claim 4, wherein the spring holder part lies clampingly against the wall of the atomizer cavity with a close fit and wherein the valve holder part lies clampingly against the wall of the spring chamber with a close fit.

6. Atomizer device according to claim 4, wherein the valve body comprises a relatively stiff disc on which the spring means support in the spring chamber and wherein the disc body hits an edge of the valve cavity in the first, closing state.

7. Atomizer device according to claim 4, wherein the spring chamber in the spring holder part is airtight and, at least in the second state, an air content is confined therein.

8. Atomizer device according to claim 1 wherein the atomizer body is encased in an atomizer holder of an atomizer unit.

9. Atomizer device according to claim 1 wherein the spring means comprise a coil spring.

10. Atomizer device according to claim 1 wherein the first operative cross-section is equivalent to a first effective cross-section over which the liquid acts on the valve body, and the second operative cross-section is equivalent to a second effective cross-section over which the valve body acts on the spring means.

11. Atomizer device according to claim 1 wherein a fraction of pressure is transmitted from the liquid to the spring, the fraction being proportional to the ratio of the first operative cross-section to the second operative cross-section.

* * * * *